Nov. 29, 1932.  L. W. BLAU  1,888,976
APPARATUS FOR MEASURING RELATIVE VALUES OF GRAVITY
Filed Sept. 5, 1930  2 Sheets-Sheet 1

Inventor
Ludwig W. Blau
By
W. E. Currie Attorney

Patented Nov. 29, 1932

1,888,976

UNITED STATES PATENT OFFICE

LUDWIG W. BLAU, OF HOUSTON, TEXAS, ASSIGNOR TO STANDARD OIL DEVELOPMENT COMPANY, A CORPORATION OF DELAWARE

APPARATUS FOR MEASURING RELATIVE VALUES OF GRAVITY

Application filed September 5, 1930. Serial No. 479,841.

Figure 1:
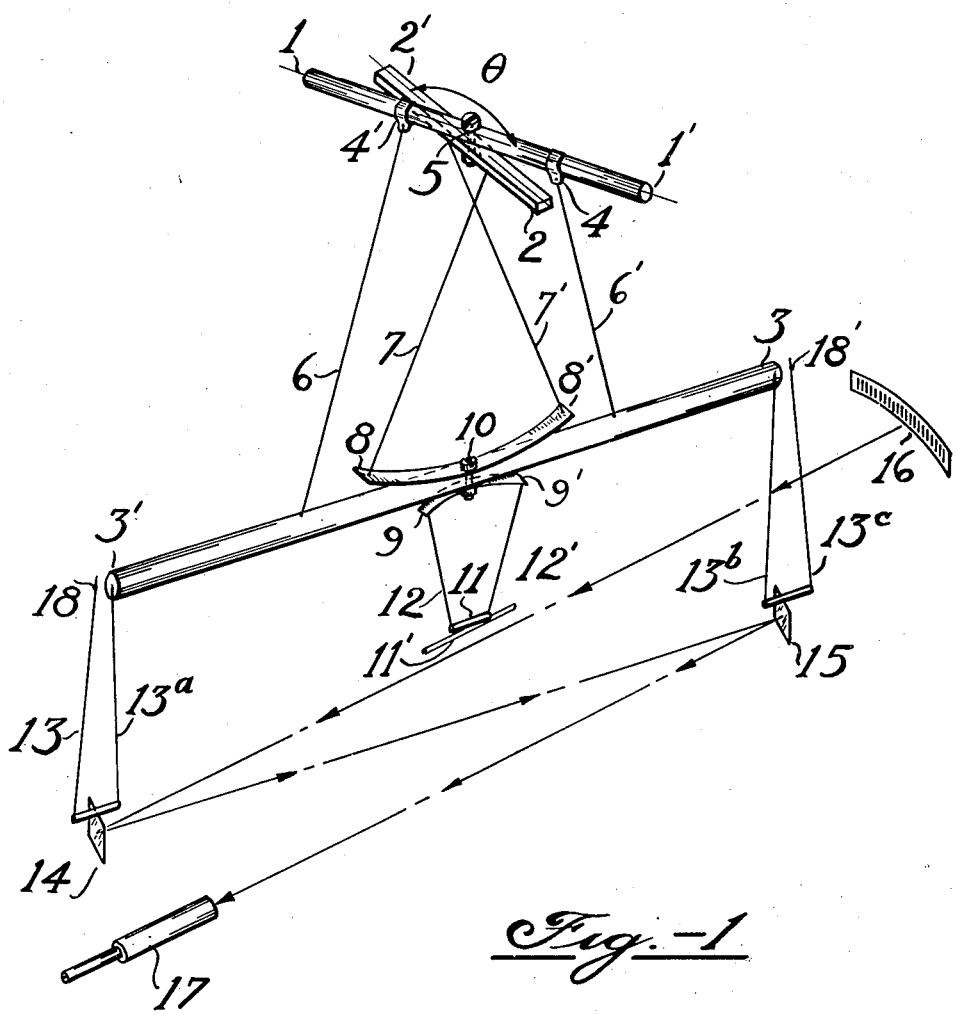
Figure 2:
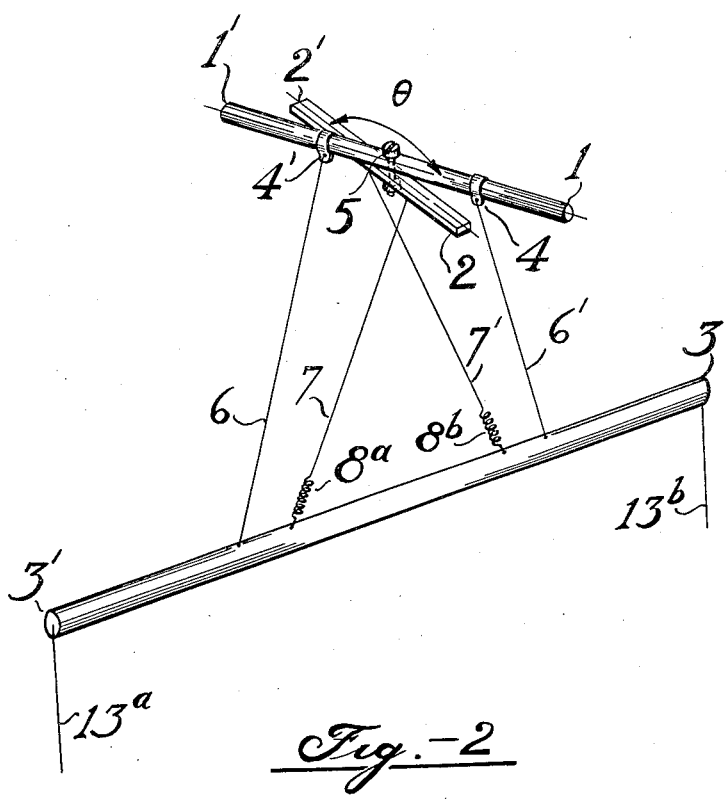

This invention relates to a new method and apparatus for measuring the gravitational force at any given location and will be understood from the following description read in conjunction with the drawings in which;

Fig. 1 represents a perspective view of one form of the apparatus for carrying out the invention, and Fig. 2 represents a perspective view of part of a modified form of the apparatus.

The main object of the invention is to transform vertical deflections due to changes in gravity into rotational deflections.

Another object is to considerably reduce the time of observation at a station.

Still another object is to eliminate the injurious effects of the change of temperature on the observed readings and to thus improve the exactness of the measurements.

Other objects and advantages of my invention will be apparent in the course of the following description:

At the present time the physical pendulum is the only instrument used to measure relative values of gravity. A pendulum measurement of gravity at a station, however, requires several days of observation and no sensitiveness greater than one part in a million has yet been attained. The present invention permits of reducing the time of observation at a station to less than an hour and to obtain a sensitiveness equal to one part in ten million.

In Fig. 1 the beam 3, 3' is shown suspended from the bar 1, 1' by means of a group of two wires or filaments 6, 6' and two sliding contacts 4, 4'. To the top center part of beam 3, 3', is fastened a flat spring 8, 8' by means of a screw headed bolt 10. The ends of the flat spring are connected by means of a group of wires or filaments 7, 7', with a bar 2, 2' at appropriate distances from the common center of rotation of the bars 2, 2' and 1, 1' held together by a screw headed bolt 5. The beam 3, 3' is adapted to carry suitably arranged masses. The Kelvin bifilar suspension mirrors 14 and 15 are suspended by means of wires or threads 13, 13a, 13b and 13c from the points 18, 18' of the frame of the apparatus and the ends of the beam 3, 3', respectively. These mirrors serve the purpose of magnifying the rotation of the beam 3, 3'. A beam of light leaving the scale 16 is reflected from the mirror 14 to the mirror 15 and thence into the telescope 17. The magnification of the angular rotation of the beam 3, 3' is increased by decreasing the distance between the ends of the beam and the points 18 and 18'. To express it more exactly the magnification is proportional to the ratio of half the length of the beam and the distance between the ends of the beam and the points 18 and 18'.

Another flat spring 9, 9' is fastened to the lower side of the beam 3, 3' opposite the spring 8, 8' by means of the screw headed bolt 10. Wires or threads 12, 12' join the ends of spring 9, 9' to a rod 11 which is fastened to the frame 11' of the apparatus by means of a screw headed bolt (not shown). This latter spring is employed with a view of compensating for the effects of temperature changes. An increase of temperature has the effect of decreasing the stiffness of the spring 8, 8' and consequently tends to cause a rotation of the beam 3, 3'; the same increase of temperature will also decrease the stiffness of the spring 9, 9' and tend to cause a rotation of the beam 3, 3' in the opposite direction. To make the operation of the apparatus possible it is necessary for the spring 9, 9' to be much weaker than spring 8, 8'. Furthermore the spring 9, 9' will be prepared of material which is much more affected by temperature changes than the material of spring 8, 8'. Thus 9, 9' has only a small effect on the period of oscillation of the beam 3, 3' because it is weak but it will be quite efficient in compensating the effects of temperature changes.

The bars 1, 1' and 2, 2' are adjusted by means of a screw headed bolt 5 so that they form a certain angle $\theta$ with their axis. Then under a certain gravity pull the bars 3, 3' will come into equilibrium and align itself in a certain direction which will depend on the angle $\theta$, on the points of attachment of wires or threads 6, 6', 7, 7', on the strength (material thickness, breadth and length) of spring 8, 8' and on the pull exercised upon the beam 3, 3' by the local gravitational force. An increase in gravity will tend to lower the beam 3, 3', or what amounts to the same, to bring the inextensible wires 6, 6' nearer to the vertical position. Consequently, there will result a rotation of the beam 3, 3' simultaneously with its lowering. The factors influencing the direction of the beam 3, 3' can be so chosen that the rotation of the beam will by far exceed its lowering. There results therefor a substantial magnification of the effect due to the change in the value of gravity.

The sensitiveness of the instrument varies with the square of the period of oscillation. This period may be increased or decreased by increasing or decreasing the angle $\theta$ or by moving the sliding contacts 4, 4' toward or away from the center screw 5, or by moving the attachment of wires 7, 7', in the same direction on bar 2, 2'. As described above, the Kelvin bifilar suspension mirror is preferably used to measure the extent of rotation.

It will be understood that the invention may be carried out by different means than those just described. Thus, for example, the flat spring 8, 8' can be dispensed with and extensible threads 7, 7' or wires of great elasticity may be used and directly attached with their ends to appropriate points of beam 3, 3'. Another, more practical modification is shown in Fig. 2 in which the threads or wires 7, 7' are attached to beam 3, 3' by means of coil springs 8b and 8c. In all these modifications, however, it is necessary to make the other pair of suspending means viz., 6, 6' practically inextensible so that the beam 3, 3' is forced to perform a rotational movement simultaneously with the lowering of its center of gravity.

Various changes may be made within the scope of the appended claims in which it is desired to claim all novelty inherent in the invention as broadly as the prior art permits.

Having thus described my invention and the method of carrying it out, what I claim is:

1. An apparatus for measuring relative values of gravity comprising two bars attached to each other at their center at an angle, a beam, a pair of inextensible filaments for suspending the beam from one of the bars, a second pair of filaments, one end of each filament being connected to the second bar, means for yieldingly connecting the other end of the second pair of filaments to the beam and means for registering the rotational deflections of the beam due to changes in gravity.

2. The apparatus according to claim 1 in which the beam is yieldingly connected to the frame of the apparatus by spring means.

3. The apparatus according to claim 1 in which the means for attaching the second pair of filaments to the beam consists of a flat spring, and another flat spring is provided opposite the first flat spring, the second flat spring being connected to the frame of the apparatus by means of inextensible filaments.

4. An apparatus for measuring relative values of gravity, comprising a support, a beam, a group of filaments suspending the beam from the support in a given position, means including a second group of filaments connected to the support out of alignment with the connection with the first mentioned filaments with the support partially supporting the beam in vertical displacement from the first mentioned position whereby the beam is suspended in equilibrium in horizontally rotated position with respect to the first mentioned position.

5. An apparatus for measuring relative values of gravity, comprising a support, a beam, a group of filaments suspending the beam from the support in a given position, a second group of filaments connected to the support out of alignment with the connection of the first mentioned filaments with the support, and means partially supporting the beam from the second group in vertical displacement from the first mentioned position whereby the beam is suspended in equilibrium in horizontally rotated position with respect to the first mentioned position.

6. An apparatus for measuring relative values of gravity, comprising a support, a beam, a group of filaments suspending the beam from the support in a given position, a second group of filaments connected to the support out of alignment with the connection of the first mentioned group of filaments with the support, and means yieldingly partially supporting the beam from the second group of filaments in vertical displacement from the first mentioned position whereby the beam is suspended in equilibrium in horizontally rotated position with respect to the first mentioned.

7. An apparatus for measuring relative values of gravity, comprising a support, a beam, a group of filaments suspending the beam from the support in a given position, a second group of filaments connected to the support out of alignment with the connection of the first mentioned filaments with the support partially supporting the beam in vertical displacement from the first mentioned position whereby the beam is suspended in equilibrium in horizontally rotated position with respect to the first mentioned position, and means for registering the rotational deflections of the beam due to changes in gravity.

8. An apparatus for measuring relative values of gravity according to claim 7 in which the means for registering the rotational deflections of the beam include mirrors, means for suspending a portion of the mirrors from opposite ends of the beam, and means for suspending another portion of the mirrors from the support whereby rotational deflection of the beam effects angular deflection of the mirrors.

9. An apparatus for measuring relative values of gravity, comprising a support, a beam, a group of filaments suspending the beam from the support in a given position, a second group of filaments connected to the support out of alignment with the connection of the first mentioned filaments with the support, a leaf spring secured intermediate its ends to the beam, the second group of filaments being connected to the free ends of the leaf spring partially supporting the beam suspended in equilibrium in displaced position vertically and rotated horizontally with respect to the first mentioned position.

10. An apparatus for measuring relative values of gravity, comprising a support, a beam, a group of filaments suspending the beam from the support in a given position, helical springs affixed to longitudinally spaced portions of the beam, a second group of filaments connected to the support out of alignment with the connection of the first mentioned filaments with the support and connected to the helical springs whereby the beam is suspended in equilibrium in displaced position vertically and rotated horizontally with respect to the first mentioned position.

11. An apparatus for measuring relative values of gravity, comprising a support, a beam, a group of filaments suspending the beam from the support in a given position, a second group of filaments connected to the support out of alignment with the connection of the first mentioned filaments with the support, means yieldingly partially supporting the beam from the second group of filaments whereby the beam is suspended in equilibrium in horizontally rotated position with respect to the first mentioned position, a frame below the beam, a third group of filaments connected to the frame, and means yieldingly connecting the third group of filaments to spaced portions of the beam whereby the effects of temperature changes upon the rotation of the beam are compensated.

12. An apparatus for measuring relative values of gravity, comprising a support, a beam, a group of filaments suspending the beam from the support in a given position, a second group of filaments connected to the support out of alignment with the connection of the first mentioned filaments with the support, means yieldingly partially supporting the beam from the second group of filaments whereby the beam is suspended in equilibrium in horizontally rotated position with respect to the first mentioned position, a leaf spring attached between its ends to the beam, a frame beneath the beam, and a third group of filaments attached to the free ends of the spring and to the frame exerting a downward pull upon the beam whereby the effects of temperature changes upon the rotation of the beam are compensated.

LUDWIG W. BLAU.